Patented Nov. 11, 1941

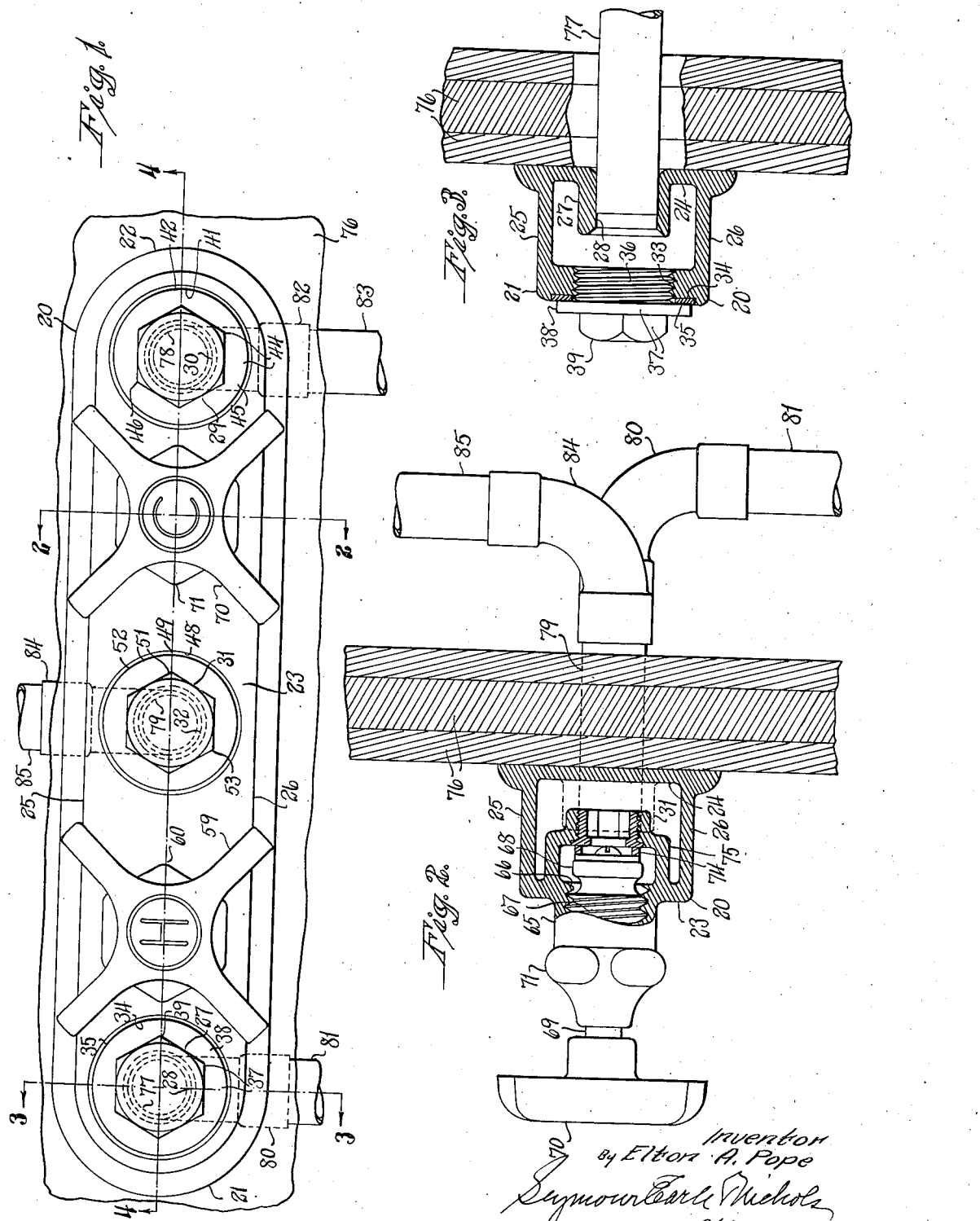

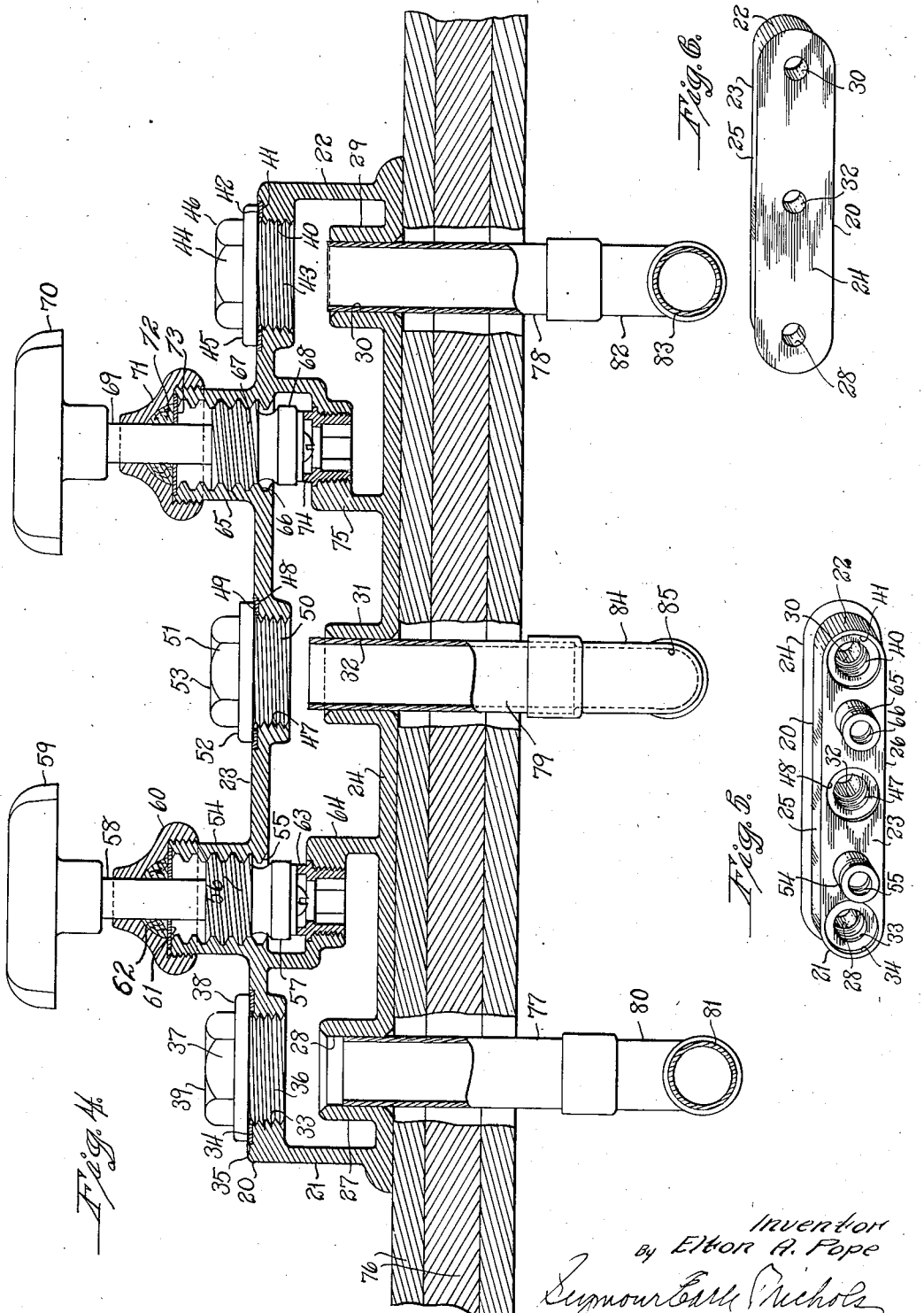

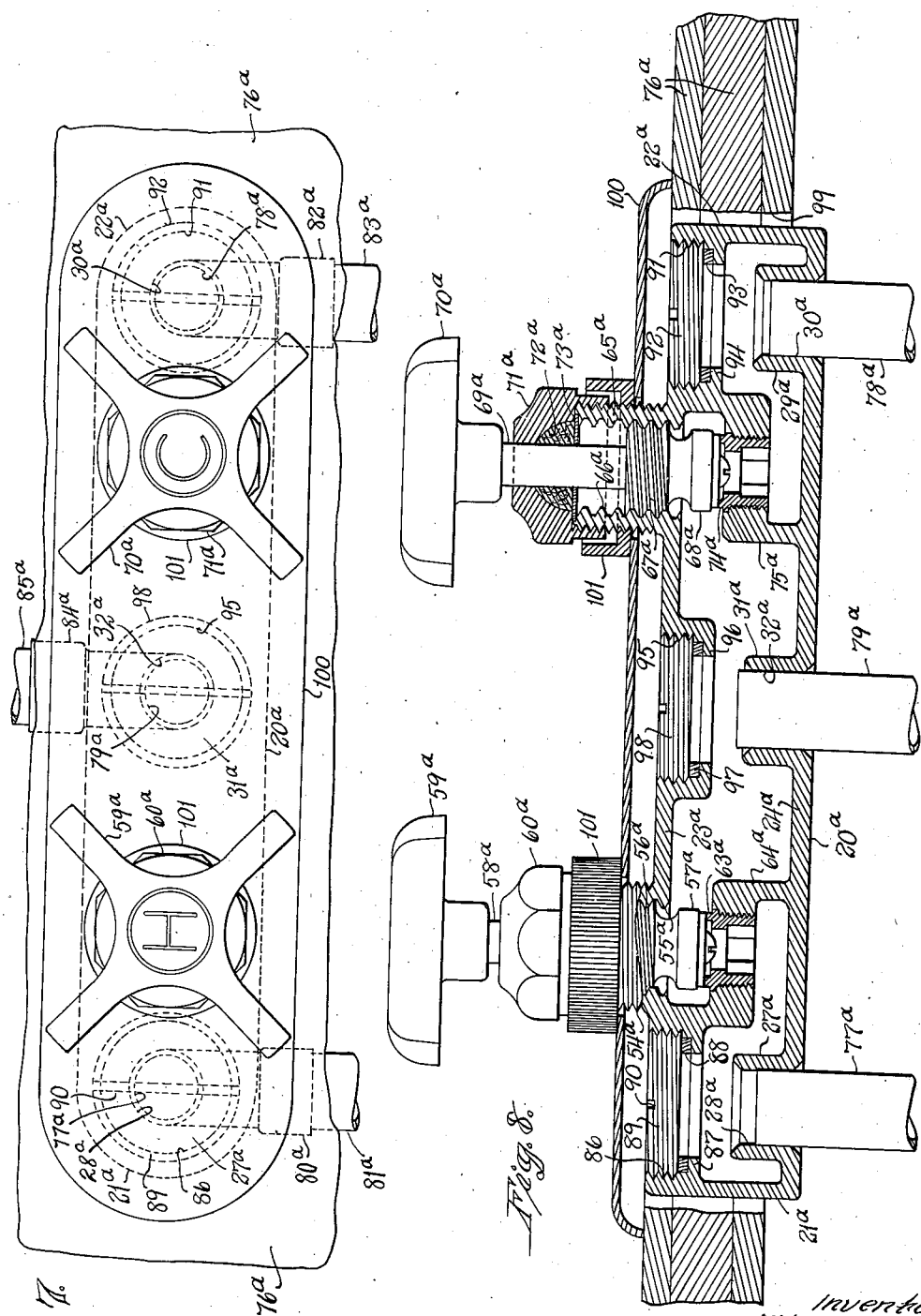

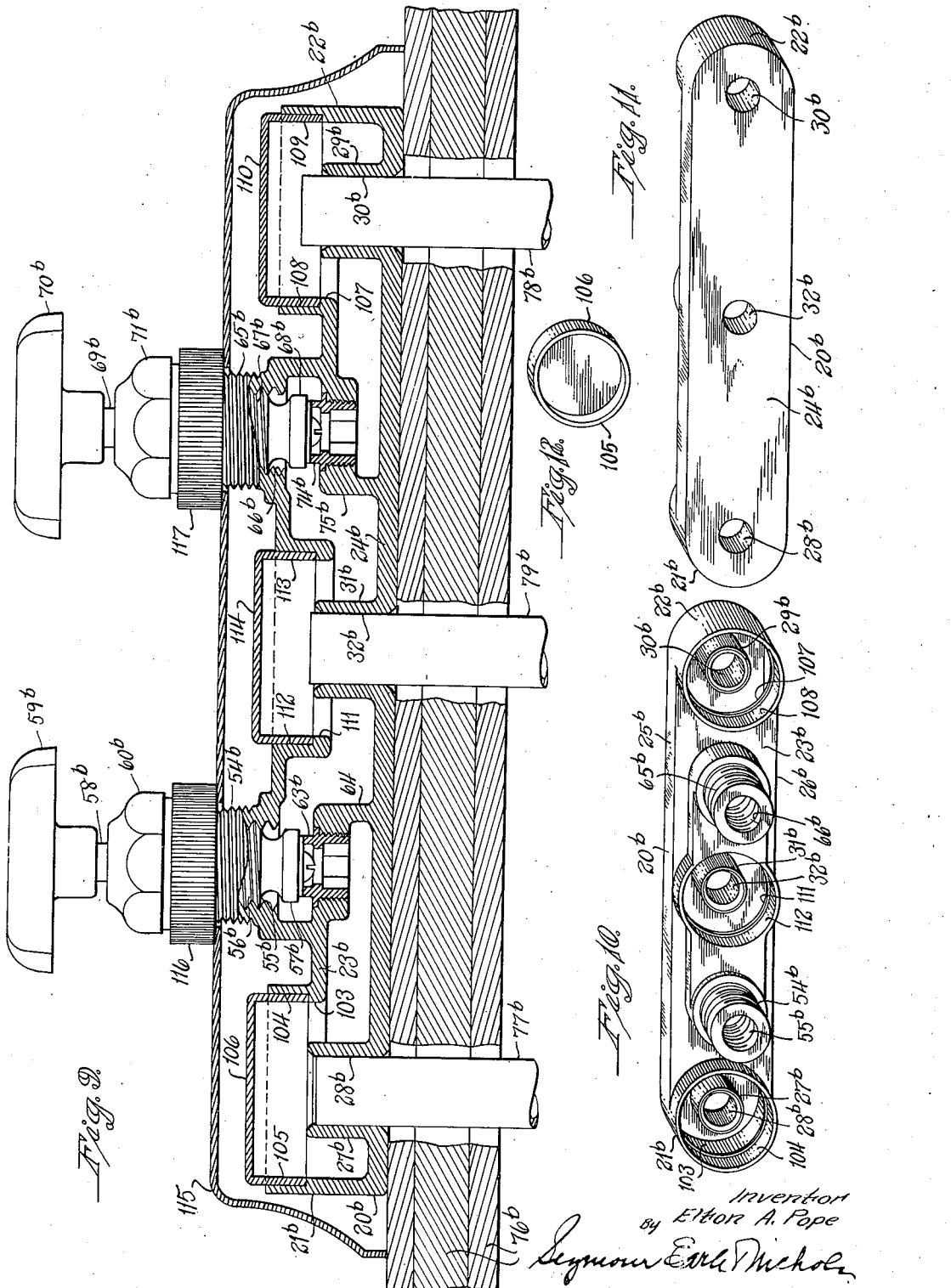

2,262,046

UNITED STATES PATENT OFFICE 2,262,046

PLURAL-VALVE PLUMBING FIXTURE

Elton A. Pope, Waterbury, Conn., assignor to Chase Brass & Copper Co. Incorporated, Waterbury, Conn., a corporation Application April 23, 1940, Serial No. 331,078

5 Claims. (Cl. 137—111)

The present invention relates to improvements in plumbing-fixtures and more particularly to plumbing-fixtures having two or more valves each having distinct piping connections but which feed water to a common outlet.

One of the main objects of the present invention is to provide a superior plural-valve plumbing-fixture which may be readily and conveniently coupled to piping by means of solder or the like.

Another object of the present invention is to provide a superior plural-valve plumbing-fixture which may be produced at low cost for manufacture and which may be installed with low labor costs.

A further object of the present invention is to provide a superior plumbing-fixture of the character referred to, which may be readily and conveniently coupled to a plurality of pipes or the like despite differences in the degrees of projection of such pipes or the like with respect to a wall-surface.

Still another object of the present invention is to provide a superior plural-valve plumbing-fixture which may be readily and conveniently positioned at varying distances with respect to a wall-surface in order to accommodate escutcheons or other covering means of varying depths and designs.

A still further object of the present invention is to provide a superior plumbing-fixture of the character referred to, which requires a minimum of space for its accommodation.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 1 is a view in front elevation of one form of plural-valve plumbing-fixture embodying the present invention and shown in conjunction with a portion of a wall-structure and associated piping;

Fig. 2 is a vertical sectional view taken on the line 2—2 of Fig. 1;

Fig. 3 is a similar view but taken on the line 3—3 of Fig. 1;

Fig. 4 is a horizontal sectional view taken on the line 4—4 of Fig. 1;

Fig. 5 is a perspective view of the distributing-head of the structure of the preceding figures and viewing the same mainly from the front;

Fig. 6 is a corresponding view but viewing the distributing-head mainly from the rear;

Fig. 7 is a view in front elevation of the general nature of Fig. 1 but showing another embodiment of the present invention;

Fig. 8 is a horizontal central longitudinal sectional view through the structure of Fig. 7;

Fig. 9 is a horizontal sectional view of the same character as Figs. 4 and 8, but illustrating still another embodiment of the present invention;

Fig. 10 is a perspective view of the distributing-head of the structure shown in Fig. 9, and viewing the said distributing-head mainly from the front;

Fig. 11 is a similar view but viewing the distributing-head mainly from the rear; and Fig. 12 is a perspective view of one of the closures shown in Fig. 9.

The structure of Figs. 1 to 6 inclusive

In the form of the present invention illustrated in Figs. 1 to 6 inclusive, a hollow distributing-head 20 is employed which may be conveniently produced by casting the same from brass or other suitable corrosion-resistant and solderable material. The particular distributing-head 20 is of bar-like form in general appearance inasmuch as it is considerably greater in length than in its lateral dimensions, and has two cylindrically-contoured hollow end-portions 21 and 22 respectively at its opposite ends.

The hollow distributing-head is of substantially-rectangular form in cross section and includes a front-wall 23, a parallel back-wall 24, a top-wall 25 and a complemental bottom-wall 26.

Adjacent its cylindrically-contoured end-portion 21, the distributing-head 20 has its back-wall 24 provided with a tubular inlet-boss 27 projecting forwardly from the said back-wall into the hollow interior of the distributing-head, as is shown especially well in Figs. 3 and 4. Extending through the inlet-boss 27 and also through the back-wall 24 is a smooth unthreaded cylindrically-contoured hot-water-inlet passage 28.

Adjacent the cylindrically-contoured end-portion 22, the distributing-head 20 has its back-wall 24 formed with an inlet-boss 29 projecting forwardly from the said back-wall into the hollow interior of the distributing-head. Extending from front to rear through the inlet-boss 29 just referred to and through the back-wall 24, is a smooth unthreaded cylindrically-contoured cold-water-inlet passage 30 corresponding to and extending in parallelism with the hot-water-inlet passage 28 before referred to.

Centrally intermediate the inlet-bosses 27 and 29 before referred to, the back-wall 24 of the distributing-head 20 is formed with a forwardly-projecting tubular outlet-boss 31 through which and through the back-wall 24 extends a mixed-water-outlet passage 32 corresponding to the passages 28 and 30 before referred to, and extending in parallelism therewith.

Axially in line with the hot-water inlet passage 28, the front-wall 23 of the distributing-head is formed with a threaded access-port 33 leading from the exterior to the interior of the distributing-head and formed adjacent its outer end with an annular gasket-recess 34 receiving a ring-like gasket 35. Installed in the access-port 33 is the externally-threaded shank 36 of a closure or plug generally designated by the reference character 37. The closure 37 just referred to is formed with an annular radially-extending sealing-flange 38 having its rear face seated against the gasket 35, as is shown particularly well in Figs. 3 and 4. The closure 37 is also formed with a forwardly-projecting though relatively-short hexagonal wrench-receiving portion 39 by means of which the closure may be turned.

Arranged axially in line with the cold-water-inlet passage 30 and in the front-wall 23 of the distributing-head 20 is an internally-threaded access-port 40 leading from the exterior to the interior of the distributing-head. Adjacent its outer end the said access-port 40 is formed with an annular gasket-recess 41 receiving a gasket 42. Threaded into the access-port 40 is the externally-threaded stem or shank 43 of a closure of plug generally designated by the reference character 44. The said closure 44 is formed about midway of its length with an annular radially-extending sealing-flange 45 having its rear face seated against the gasket 42 before referred to. The closure 44 is also formed with a forwardly-projecting hexagonal wrench-receiving portion 46 or with other suitable means by which it may be conveniently threaded into and out of place.

Substantially centrally of the length of the distributing-head 20, the front-wall 23 thereof is formed with a threaded access-port 47 arranged coaxially with respect to the mixed-water-outlet passage 32 and leading from the front face of the distributing-head into the hollow interior thereof. Adjacent its outer end the access-port 47 is formed with an annular gasket-recess 48 receiving a ring-like gasket 49. Threaded into the threaded access-port 47 is the externally-threaded stem or shank 50 of a closure or plug generally designated by the reference character 51. Like the closures 37 and 44 before referred to, the closure 51 is provided about midway of its length with an annular radially-projecting sealing-flange 52 seating against the gasket 49. The said closure 51 is also formed with a hexagonal wrench-receiving portion 53 corresponding to the portions 39 and 46 of the closures 37 and 44 before referred to.

Intermediate the access-ports 33 and 47, the front-wall 23 of the distributing-head 20 is provided with an integral forwardly-projecting tubular hot-water-valve-receiving portion 54. The said portion 54 is formed internally with threads 55 which are engaged by the threads 56 upon the exterior of a valve-head 57 constructed and arranged to control the flow of hot water into the hollow interior of the distributing-head as will more fully hereinafter appear.

The valve-head 57 is provided with a rigid forwardly-projecting valve-stem 58 which is provided at its exposed forward end with an operating-handle 59 by means of which the valve-head 57 may be advanced and retired. Adjacent its forward end the hot-water-valve-receiving portion 54 is externally threaded, as shown, for the reception of a packing-nut 60 through which the valve-stem 58 extends. Within the packing-nut 60 and seated against the front edge of the hot-water-valve-receiving portion 54 is a gasket-retaining washer 61 having a compressible packing-gasket 62 between its front face and the rear face of the forward portion of the packing-nut 60.

The inner face of the valve-head 57 in the hot-water-valve-receiving portion 54 of the distributing-head 20 is adapted to engage with the forward edge of a replaceable tubular valve-seat 63 which is externally threaded and screwed into a threaded aperture in the central portion of a Z-shaped partition 64 which, save for the passage afforded through the tubular valve-seat 63, partitions-off the hot-water-inlet passage 28 from the mixed-water-outlet passage 32.

Intermediate the central access-port 47 and the access-port 40 the front-wall 23 of the distributing-head 20 is formed with an integral forwardly-projecting cold-water-valve-receiving portion 65 of tubular form. The said portion 65 is formed internally with threads 66 which are engaged by threads 67 upon the periphery of a valve-head 68 which is designed and adapted to control the flow of cold water into the interior of the distributing-head in a manner as will hereinafter appear.

Forwardly extending from the valve-head 68 above referred to and rigid therewith is a valve-stem 69 provided at its exposed forward end with an operating-handle 70 by means of which the said valve-head 69 may be advanced and retired. Adjacent its forward end the cold-water-valve-receiving portion 65 is externally threaded, as shown, for the reception of a packing-nut 71 through which the valve-stem 69 extends. The packing-nut 71 is of general cup-shaped form and has located in its interior a compressible packing-gasket 72 normally pressed rearwardly by the said packing-nut against the forward face of a gasket-retaining washer 73 seated against the forward edge of the cold-water-valve-receiving portion 65.

The rear face of the valve-head 68 is adapted to engage with the forward edge of an externally-threaded tubular valve-seat 74 to shut off the flow of cold water into the hollow interior of the distributing-head 20. The said tubular valve-seat 74 is screwed into the apertured central portion of a Z-shaped partition 75 which, save for the passage through the tubular valve-seat 74, partitions-off the cold-water-inlet passage 30 from the mixed-water-outlet passage 32.

The distributing-head 20 may be installed so that the rear face of its back-wall 24 rests against the front face of a wall-structure 76, by sleeving the three passages 28, 30 and 32 respectively over the adjacent forward ends of a horizontal hot-water-supply tube 77, a cold-water-supply tube 78 and a mixed-water-outlet tube 79. The respective forward terminals of the tubes 77, 78 and 79 just referred to, are cylindrically contoured and proportioned to snugly telescopically interfit respectively within the passages 28, 30 and 32 referred to, so as to be readily sweat-solderable in place after the parts have been thoroughly cleaned and coated with a suitable flux. The "close" or "snug" telescopic interfitting referred to should be of such character as to provide for the capillary flow of solder or other cementing material between the opposed surfaces.

The various tubes 77, 78 and 79 may be connected at their rear ends into appropriate features of a plumbing system in manners which may vary in accordance with the exigencies of any given situation.

As shown, the rear end of the hot-water-supply tube 77 is coupled to an elbow 80 curving downwardly-and-rearwardly therefrom and having its lower end connected in turn to a vertical hot-water-supply tube 81 leading downwardly to a suitable source of hot water.

In a similar manner, the cold-water-supply tube 78 has its rear end connected to a downwardly-and-rearwardly-curved elbow 82 which is connected at its lower end to a vertical cold-water-supply tube 83 leading downwardly to a suitable source of cold water.

In a manner similar to that described above in connection with tubes 77 and 78, the rear end of the horizontal mixed-water-outlet tube 79 is connected to the adjacent end of an upwardly-and-rearwardly-curved elbow 84 which is connected in turn to the adjacent lower end of a vertical mixed-water-outlet tube 85 leading from the said elbow for connection to a shower head or the like.

After the sleeving of the three passages 28, 30 and 32 over the respective tubes 77, 78 and 79, the sweat soldering of the said parts may be accomplished through the respective access-ports 33, 40 and 47 prior to the installation in the said ports of the closures 37, 44 and 51. When the sweat soldering is completed, the closures 37, 44 and 51 may be firmly threaded into the respective access-ports 33, 40 and 47 to prevent the escape of fluid through the said access-ports.

It may be noted that despite variations in the positions of the outer ends of the tubes 77, 78 and 79 with respect to the front face of the wall-structure 76 (within reasonable limits), the telescopic interfitting of the passages 28, 30 and 32 respectively with the said tubes 77, 78 and 79 will readily compensate for such variations.

*The structure of Figs. 7 and 8*

The plural-valve plumbing-fixture illustrated in Figs. 7 and 8 corresponds in the main to the structure of Figs. 1 to 6 inclusive, and will bear like reference characters plus the reference character *a* save in instances where new reference characters are required.

Substantially axially in line with its hot-water-inlet passage 28a, the distributing-head 20a is formed with an internally-threaded access-port 86 leading from the interior to the exterior through the front-wall 23a. At its inner end the said access-port 86 is formed with an inwardly-extending annular flange 87, the forward face of which provides a seat for a gasket 88. Threaded into the outer portion of the access-port 86 is a disk-like closure or plug 89 having its outer face lying substantially flush with the forward face of the front-wall 23a and provided with a kerf 90.

Axially in line with the cold-water-inlet passage 30a, the front-wall 23a of the distributing-head 20a is provided with a threaded access-port 91 receiving a closure or plug 92 corresponding to the closure 89, and like the same, having its inner face seated against a gasket 93 which, in turn, is seated against an annular flange 94 extending around the inner portion of the said access-port 91.

In a manner similar to the structure of Figs. 1 to 6 inclusive, the distributing-head 20a is formed axially in line with its mixed-water-outlet passage 32a with an internally-threaded access-port 95 having at its inner end an inwardly-projecting annular flange 96 against the front face of which is seated a ring-like gasket 97. Threaded into the access-port 95 so as to engage its rear face with the front face of the gasket 97 is a closure or plug 98 corresponding to the closures 89 and 92 before referred to.

The distributing-head 20a instead of being mounted forwardly of a wall-surface as was the case with the distributing-head 20, is mounted in an aperture 99 in a wall-structure 76a, so that the forward face of the front-wall 23a of the said distributing-head 20a is substantially flush with the front face of the wall-structure 76a. Extending over the forward face of the front-wall 23a of the distributing-head 20a is a shallow escutcheon-plate 100 which may be conveniently struck-up from sheet metal and which has its edge engaged with the front face of the wall-structure 76a so as to conceal the aperture 99 in the latter.

The escutcheon-plate 100 is suitably apertured to permit the hot-water-valve-receiving portion 54a and the cold-water-valve-receiving portion 65a thereof to project forwardly beyond the front face of the said escutcheon-plate. For the purpose of retaining the escutcheon-plate 100 in place, the hot-water-valve-receiving portion 54a and the cold-water-valve-receiving portion 65a are each provided with one of two cup-shaped retaining-nuts 101—101.

From the foregoing it will be seen that the structure of Figs. 7 and 8 possesses the same fundamental characteristics as the structure of the preceding figures.

*The structure of Figs. 9 to 12 inclusive*

The plural-valve plumbing-fixture illustrated in Figs. 9 to 12 inclusive also corresponds in fundamental characteristics to the structure of Figs. 1 to 6 inclusive, and will therefore bear like reference characters plus the reference character *b* save in instances where new reference characters are required.

The distributing-head 20b is formed in its front-wall 23b axially in line with the hot-water-inlet passage 28b with an unthreaded access-port 103 which is slightly enlarged at its outer portion to provide a substantially-smooth unthreaded cylindrically-contoured socket-portion 104. The said socket-portion 104 receives with a snug sliding fit the cylindrically-contoured skirt-portion 105 of a cup-shaped closure generally designated by the reference character 106. The exterior surface of the skirt-portion 105 of the closure 106 is proportioned to snugly fit the socket-portion 104 and is sweat soldered in place therein after the hot-water-supply tube 77b has been sweat-soldered in the hot-water-inlet passage 28b.

The front-wall 23b of the distributing-head 20b is also provided with an access-port 107 arranged axially in line with the cold-water-inlet passage 30b and like the access-port 103, is provided with a slightly-enlarged socket-portion 108 receiving with a snug telescopic fit the skirt-portion 109 of a cup-shaped closure 110. The closure 110 may be sweat-soldered into the socket 108 in a manner already described in connection with the closure 106.

Also formed in the front-wall 23b of the distributing-head 20b midway the length thereof and axially in line with the mixed-water-outlet passage 32b is an access-port 111 having a socket-portion 112 in which is sweat-soldered the skirt-portion 113 of a cup-shaped closure 114.

In the instance shown, the distributing-head 20b is placed so that its rear wall rests against the front surface of a wall-structure 76b so as to be mainly covered by a relatively-deep escutcheon 115 which may be conveniently formed of sheet metal. The said escutcheon is secured in place by retaining-nuts 116 and 117 respectively threaded onto the hot-water-valve-receiving portion 54b and the cold-water-valve-receiving portion 65b of the distributing-head 20b.

General considerations

All of the plural-valve plumbing-fixtures herein shown and described are characterized by their capacity for being telescoped over two inlet-tubes and an outlet-tube to varying degrees as may be required by varying conditions. Furthermore, the various water passages and the tubes telescoped thereinto are made readily available for sweat-soldering or the like through one or more suitable access-ports. It will be apparent from the drawings that when a given closure is removed from its complemental access-port, the flame from a torch may be readily directed against the parts which it is desired to sweat-solder.

Preferably and as shown, individual access-ports are provided for each of the water passages through such arrangement, while preferable, is not necessary under the present invention.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A plural-valve plumbing-fixture comprising: a hollow distributing-head having a plurality of control-valves, and a plurality of substantially-parallel cylindrical-surfaced coupling-portions designed and adapted to be telescopically-interfitted with and soldered to cylindrical-surfaced end-portions of pipes or the like; access-port means designed and adapted to have heat introduced through said access-port means to the interior of said hollow distributing-head to solder the said telescopically-interfitted parts; and closure-means for said access-port means.

2. A plural-valve plumbing-fixture comprising: a hollow distributor-head having a plurality of control-valves, a front-wall, a back-wall, and a plurality of substantially parallel cylindrical-surfaced coupling-portions extending from said back-wall toward said front-wall and designed and adapted to be telescopically-interfitted with and soldered to cylindrical-surfaced end-portions of pipes or the like; access-port means in said front-wall and designed and adapted to have heat introduced through said access-port means to the interior of said hollow distributor-head to solder the said telescopically-interfitted parts; and closure-means for said access-port means.

3. A plural-valve plumbing-fixture comprising: a hollow distributing-head having a plurality of control-valves, and a plurality of substantially-parallel cylindrical-surfaced coupling-portions designed and adapted to be telescopically-interfitted with and soldered to cylindrical-surfaced end-portions of pipes or the like; access-port means designed and adapted to have heat introduced through said access-port means to the interior of said hollow distributing-head to solder the said telescopically-interfitted parts; closure-means for said access-port means; and an escutcheon covering said closure-means.

4. A plural-valve plumbing-fixture comprising: a hollow distributing-head having a plurality of control-valves, and a plurality of substantially-parallel cylindrical-surfaced coupling-portions designed and adapted to be telescopically-interfitted with and soldered to cylindrical-surfaced end-portions of pipes or the like; threaded access-port means designed and adapted to have heat introduced through said access-port means to the interior of said hollow distributing-head to solder the said telescopically-interfitted parts; and threaded closure-means for said access-port means.

5. A plural-valve plumbing-fixture comprising: a hollow distributing-head having a plurality of control-valves, and a plurality of substantially-parallel cylindrical-surfaced coupling-portions designed and adapted to be telescopically-interfitted with and soldered to cylindrical-surfaced end-portions of pipes or the like; substantially-smooth unthreaded access-port means designed and adapted to have heat introduced through said access-port means to the interior of said hollow distributing-head to solder the said telescopically-interfitted parts; and substantially-smooth unthreaded closure-means for said access-port means.

ELTON A. POPE.